Dec. 24, 1929.  F. A. PARSONS  1,740,744
FLUID TRANSMISSION AND CONTROL MEANS FOR MACHINE TOOLS
Filed Sept. 17, 1926    4 Sheets-Sheet 1
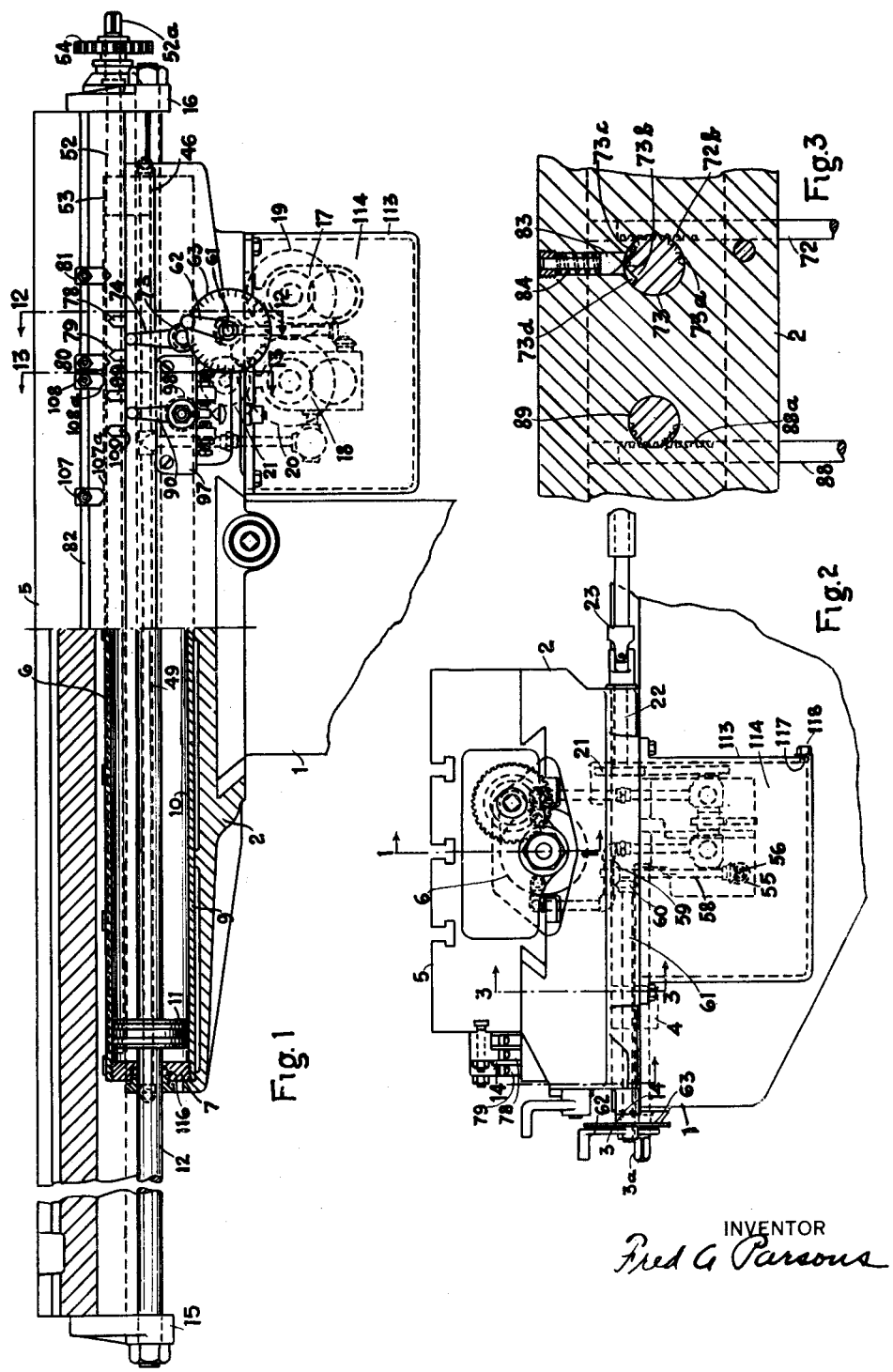
INVENTOR
Fred G. Parsons

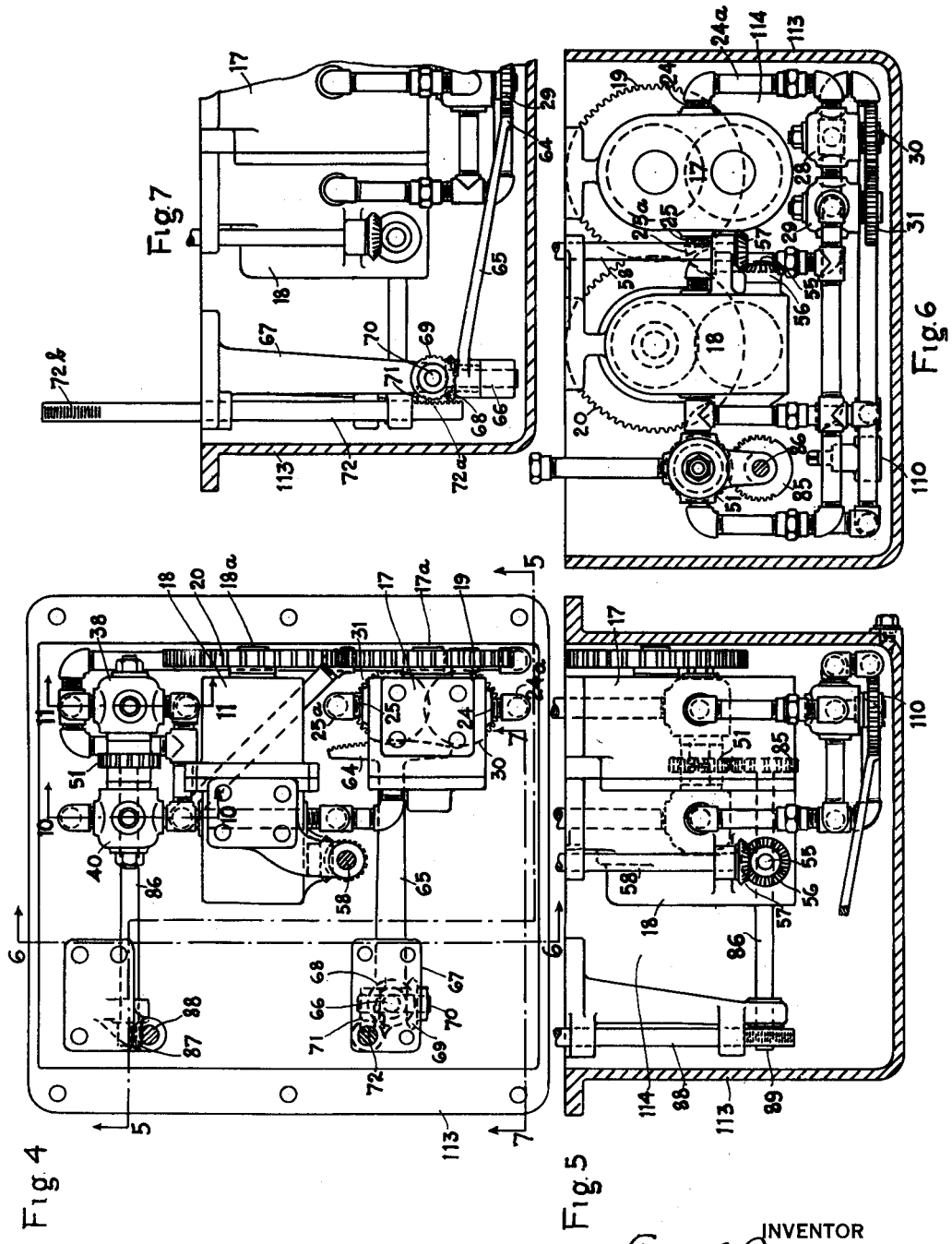

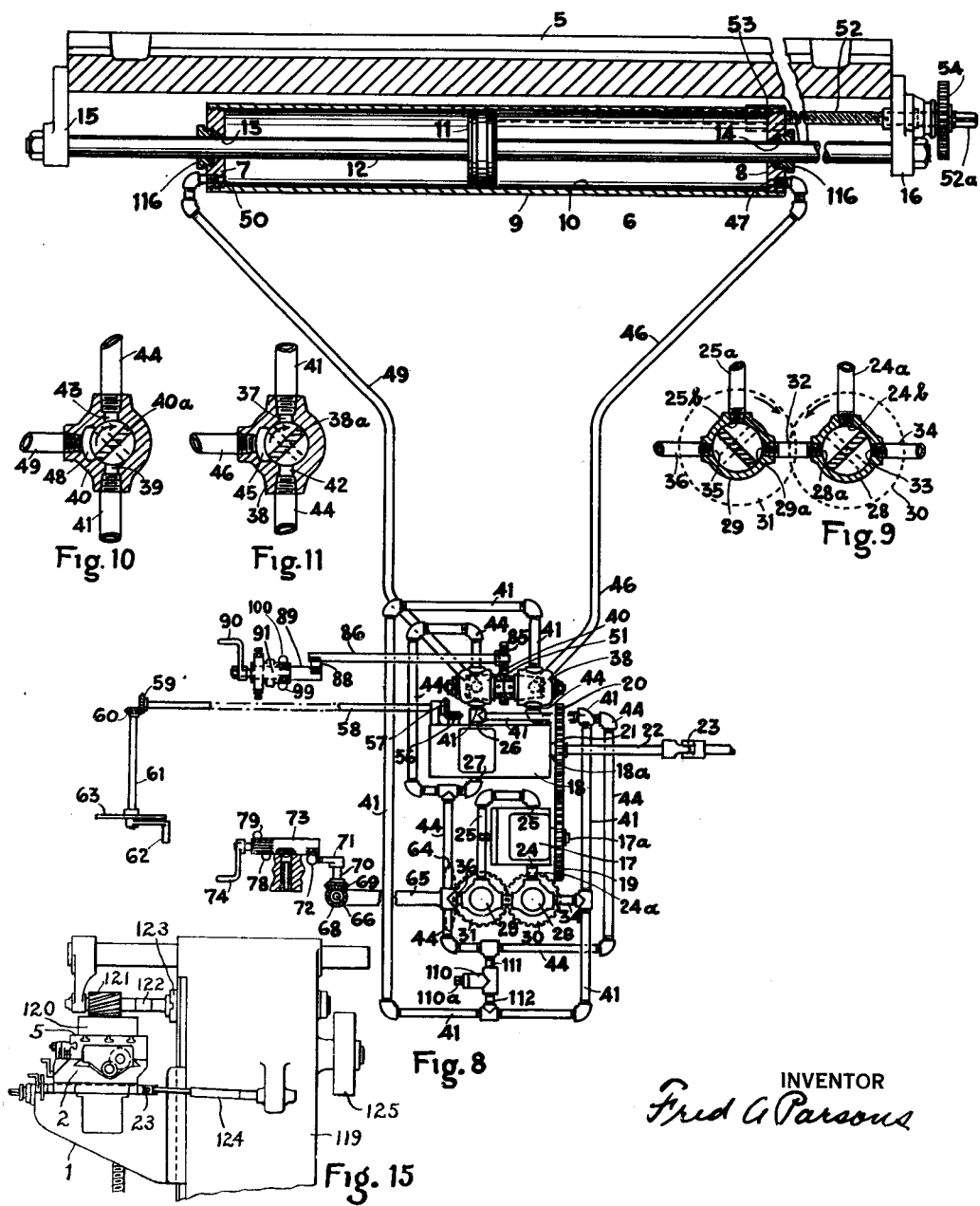

Dec. 24, 1929.   F. A. PARSONS   1,740,744
FLUID TRANSMISSION AND CONTROL MEANS FOR MACHINE TOOLS
Filed Sept. 17, 1926   4 Sheets-Sheet 4

INVENTOR
Fred A. Parsons

Patented Dec. 24, 1929

1,740,744

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

FLUID TRANSMISSION AND CONTROL MEANS FOR MACHINE TOOLS

Application filed September 17, 1926. Serial No. 136,050.

This invention relates to means for the movement of machine tool supports and more especially to fluid actuated transmission and control means therefor. It is a main purpose of this invention to provide improved hydraulic actuating means for support movement at a great variety of rates of travel although the power source may be of constant speed, and to provide improved control means for such hydraulic actuating means.

Another and very important object is to provide control means for hydraulically actuated support capable of operation after the manner of well known control means for mechanically actuated supports whereby operators familiar with previous mechanically operated machines may proceed with confidence to set up, adjust and operate the machine in a familiar manner and without regard for or even without knowledge of the construction involved.

Another purpose is to combine a hydraulic cylinder with the supporting structure of a movable machine tool support in an improved manner.

Another object is to combine hydraulic power actuating means for a movable support with mechanical means for manually actuating the support.

Another object is to provide a cylinder operated support with means for taking off power from the movement of the support for actuating other mechanism, such as an attachment and to provide such means in an improved form for driving such other mechanism in exact unison or ratio of motion with the movement of translation of the support.

Other objects relate to the organization with a machine tool support and the supporting structure therefor, of both a constant volume and a variable volume pump, each adapted to alternatively actuate the support, to provide control means therefor, and to provide such an organization in improved combination with the supporting structure of a milling machine.

Another object is generally to simplify and improve the construction and operation of means for actuating machine tool supports, and especially with reference to the various objects previously stated; and particularly with reference to machine tools of the type generally known as milling machines.

Other objects will be apparent from the following description and claims.

The invention resides in the peculiar construction and arrangement of parts herein clearly shown and described in the drawings and accompanying description and as particularly pointed out in the accompanying claims.

In the accompanying drawings like reference characters have been used to identify the same parts in each of the several views.

Fig. 1 is a front view partly in section along line 1—1 of Fig. 2, of the movable supports of a milling machine and suitable supporting structure therefor, together with actuating and control mechanism illustrating a preferred form of my invention for the movement of one of the supports. Certain of the well known parts of the milling machine are not shown.

Fig. 2 is an end elevation of the mechanism shown in Fig. 1, viewed from the right.

Fig. 3 is an enlarged section along line 3—3 of Fig. 2.

Fig. 4 is an enlarged plan view of the mechanism contained in a box or housing shown to the lower right in Fig. 1. For clearness the housing is, in Fig. 4, shown removed from the support to which it is attached as shown in Fig. 1.

Fig. 5 is a sectional elevation along line 5—5 of Fig. 4.

Fig. 6 is a sectional elevation along line 6—6 of Fig. 4.

Fig. 7 is a sectional elevation of a portion of the mechanism along a line 7—7 of Fig. 4.

Fig. 8 is a diagrammatic assembly for purposes of explanation in which the parts are not shown in true relative position or proportion.

Fig. 9 is a section through the valves controlling feed or rapid traverse.

Figs. 10 and 11 are sections through the reversing valves.

Fig. 15 shows the mechanism shown in Fig. 2 in reduced scale and as it appears when incorporated in a knee type of milling machine, the lower portion of the machine being broken away.

Figure 12:
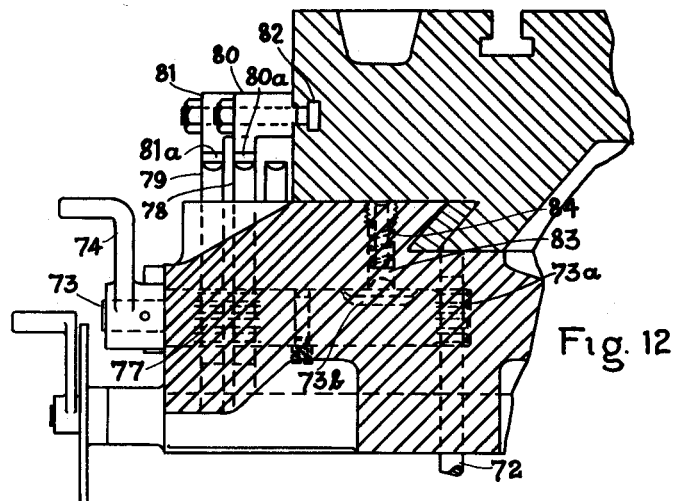
Fig. 12 is an enlarged section of a portion of saddle and table along line 12—12 of Fig. 1.

A support 1, which may be either a stationary bed or the vertically movable knee of a knee and column type milling machine such as shown in Fig. 15, slidably guides and supports a saddle or support 2 by the means of complementary guide surfaces of any well known form, one form of such surfaces being illustrated in Fig. 1. Means for the movement of saddle 2 may correspond to the hydraulic means to be described, or to any of the various well known methods, typified by a rotatable screw 3 (see Fig. 2) restrained against axial movement relative to knee 1 and in threaded engagement with a nut 4 fixed with saddle 2, the screw being provided with a squared projecting end 3ª, to which a crank, not shown, may be applied for rotating the screw.

The saddle 2 slidably guides and supports a table or work support 5 by the means of complementary guide surfaces, of any well known form, such as the form illustrated in Fig. 2. The slides for movement of the saddle and table provide for movement of the two supports in paths substantially at right angles to one another whereby table 5 is movable in two transverse paths relative to the knee 1. A hydraulic cylinder, generally denoted by the numeral 6 is provided with end walls 7 and 8 fixed with the cylinder wall 9, and within the bore 10 is closely but slidably fitted a piston 11 fixed on a piston rod 12, the opposite ends of which project through suitable bores 13 and 14 in the end walls and concentric with the cylinder bore 10, being closely but slidably fitted therein.

Cylinder 6 is fixed with saddle 2 in a position such that the travel of the piston within the cylinder is parallel to the movement of table 5, and the projecting ends of piston rod 12 are respectively fixed in brackets 15 and 16 which in turn are fixed with the table, whereby movement of the piston causes movement of the table relative to saddle 2.

For movement of the piston and table there is provided a plurality of power driven pumps 17 and 18, see Figs. 1 and 8, of different volume effect. Pump 17 is a constant volume type and may be any suitable well known form capable of positive delivery of a relatively large constant volume of fluid when operated at a given speed. Being of well known form, the pump construction is not shown here in detail. Pump 18 is of variable volume type, and may be any suitable well known form which is adjustable to deliver a relatively small maximum volume of fluid which varies according to the adjustment and at pressures which vary inversely according to the volume, when the pump is operated at a given speed and power input. A variety of pumps having such operating characteristics are well known as, for instance, the pump shown in United States Patent 595,027, December 7, 1897, or in Patent 1,177,385, March 28, 1911. Since the details of pump construction form no part of the present invention, such details are not here shown. Each of the pumps is fixed on saddle 2.

Pumps 17 and 18 respectively have drive shafts 17ª and 18ª upon which respectively are fixed the intermeshed gears 19 and 20. Meshed with gear 20 is a driver 21, see Figs. 1 and 2, fixed on shaft 22, journaled in saddle 2, and which is driven at a constant speed from any suitable power source such as a pulley or a motor not shown, by the means of an extensible universal joint shaft of well known construction, a portion 23 of which is shown. Thus both the pumps are non-reversibly driven at a constant speed from any suitable power source.

When so driven each of the pumps may deliver fluid supplied to the proper port, to the other or pressure port. In the present instance the direction of drive motion is such that pump 17 delivers fluid from a pipe or channel 24 connected with its suction or intake port, to a pipe or channel 25 connected with its exhaust or pressure port, while the pump 18 delivers fluid from a pipe or channel 26 connected with its intake or suction port to a pipe or channel 27 connected with its exhaust or pressure port. The channels 24 and 25 are respectively connected with pipes or channels generally denoted by the numerals 24ª and 25ª, communicating respectively with ports 24ᵇ and 25ᵇ of valves generally denotes as 28 and 29, see Fig. 9, and which are interconnected for movement by gears 30 and 31 fixed on the respective valve stems. The ports 28ª and 29ª of the respective valves each communicate with a pipe or channel 32. A port 33 of valve 28 communicates with a pipe or channel 34 and a port 35 of valve 29 communicates with a pipe or channel 36. The arrangement is such that movement of the gears may turn the valves to cause the channel 24ª to discharge into channel 25ª through the two valves and the channel 32, in which case the pump 17 is by-passed through the valves and channel and is ineffective; or to cause channel 24ª to communicate with channel 34 and channel 25ª to communicate with the channel 36.

The channels 34 and 26 both communicate with a port 37, see Figs. 10, 11, of a valve generally denoted by the numeral 38, having a movable portion 38ª and also with a port 39 of a valve generally denoted by the numeral 40 having a movable portion 40ª, through interconnected pipes or channels generally denoted by the numeral 41.

The channels 36 and 27 both communicate with a port 42 of valve 38 and also with a port 43 of valve 40, through interconnected pipes or channels generally denoted by the numeral 44.

Valve 38 is provided with another port 45 communicating through channels generally denoted as 46 with an opening 47 in the end of cylinder 9 and always to the right of piston 11 in Fig. 8, in any position of piston travel. Valve 40 is provided with a port 48 communicating through channels generally denoted as 49 with an opening 50 in the end of cylinder 9 and always to the left of piston 11 in Fig. 8.

The valves 38 and 40 are connected for movement, the valve stems of each being fixed with the hub of a gear 51, and the relationship and construction is such that when gear 51 is adjusted in one direction the channel 46 is connected with channel 41 through valve 38, the movable portion 38ª then standing in the full line position shown in Fig. 11 and blocking the passage between ports 42 and 45, but opening the port 37 to port 45, and channel 49 is connected with channel 44 through valve 40, the movable portion 40ª then standing in the full line position shown in Fig. 10 and blocking the passage between ports 39 and 48, but opening port 43 to port 48. From previous description it will be apparent that channels 41 and 44 are respectively connected for suction and discharge from 18 and although valves 28, 29, may be adjusted so that pump 17 is either effective or ineffective, as previously described, yet such fluid as may be delivered from either pump will then be delivered through the channels 44 and 49 to the left end of the cylinder in Fig. 8, moving the piston and table to the right; and the fluid forced out of the cylinder by the movement of piston 11 will be received through channels 46 and 41 and will be passed to the suction ports of the pumps.

When gear 51 is oppositely adjusted, the movable valve portions 38ª and 40ª move in the direction of the arrows indicated on Figs. 10 and 11 to take the position indicated by the dotted lines and the channels 41 and 49 will then be connected through valve 40, and the channels 46 and 44 through valve 38. The fluid pumped will then be delivered through channels 44 and 46 to the right end of cylinder 9 in Fig. 1 to move the piston and table to the left and fluid forced out of the cylinder by the piston movement will be delivered back to the suction ports of the pump through channels 49 and 41 through valve 40.

It will be noted by reference to Figs. 10 and 11 that the movable portions 38ª and 40ª are so proportioned and positioned relative to the dimensions and position of the ports 45 and 48 respectively, that almost immediately after the movable portions start their movement from either position to the other, the ports 45 and 48 provide a by-pass for movement of fluid between ports 42 and 37 of valve 38 and ports 43 and 39 of valve 40. Such by-passes provide free communication both between the channels 46 and 49 and also between the channels 41 and 44, whereby the pumps create no pressure against either side of piston 11 and the piston and table immediately cease power movement although the pumps may continue to operate, and whereby the table and piston may be moved manually as will be later described.

The flow of pump 18 is of relatively small maximum volume, suited, when pump 18 is operated by the drive mechanism described to give the maximum feed rate desired for the table, when valves 28 and 29 are adjusted to render pump 17 inoperative, and the range of adjustment of volume of pump 18 is such as to correspond to the range of feed rates desired. Thus pump 18 may be called a feed pump and if pump 17 is inoperative as described, the adjustment of pump 18 may give any feed rate desired to table 5. The flow of pump 17 is relatively large, suited when the pump is operated by the drive mechanism described to operate the table at a relatively fast or rapid traverse rate, if valves 28 and 29 are adjusted to render the pump flow operative. Thus the table may be operated at a feed rate, or at a rapid traverse rate in either direction, the rate being determined by the position of the valves 28 and 29 which may be called rate control valves, and the direction by the position of valves 38 and 40, which may be called direction control, or reverse valves, the direction controlling valves also operating as by-pass valves to interrupt the table power movement and to permit hand operation thereof.

A lead screw 52 is journaled in bracket 16 but is prevented from axial movement relative thereto by well known means, and is in threaded engagement at all times with a nut 53 fixed in saddle 2. Removably fixed on the exposed end of screw 52 is a gear 54. The screw 52 is of such thread angle or pitch that when table 5 is hydraulically actuated the screw is rotated, and the gear 54 provides coupling means for actuating a suitable gear in the drive frame of an attachment mounted on table 5, whereby the attachment may be actuated from the same hydraulic means which actuates table 5, but in exact time or unison with the movement of table 5.

Such attachments and driving trains therefor being well known are not shown.

Screw 52 is also provided with a squared end portion 52ª to which a crank, not shown, may be applied for manual movement of the table when the reversing valves 38 and 40 are in central position, the fluid in the opposite ends of cylinder 9 being then free to move without undue resistance to the movement of piston 11, being by-passed through valves 38 and 40 as previously described.

For manual adjustment of pump 18, to control the rate of table feed, the following mechanism is provided. Pump 18 is provided with a control shaft 55, see Figs. 2, 5, 8, etc., projecting from the pump housing, and rotatable or oscillatable for the purpose of changing the volume of liquid pumped. Fixed thereon is a bevel gear 56, meshing with a bevel gear 57 fixed on a vertical shaft 58 which has fixed on its upper end a bevel gear 59 meshing with gear 60 fixed on a shaft 61, which projects from the front of saddle 2 and has fixed thereon a hand lever 62. By the mechanism described hand lever 62 may be adjusted in the one or the other direction to give a maximum or minimum flow from pump 18 or any intermediate flow, thus determining the rate of table feed available. A suitably graduated dial or feed plate 63 is fixed on saddle 2 in a position such that the lever 62 moves over its face during pump adjustment, the position of the lever relative thereto thus indicating the feed adjustment to the operator.

Figure 14:
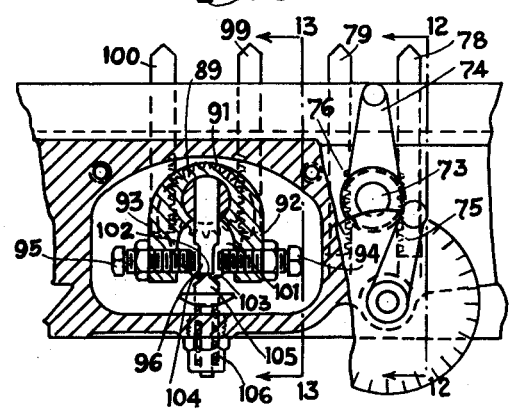
Fig. 14 is a front view partly in section of a portion of the saddle the section being taken along line 14—14 of Fig. 2.

Both manual and power movement is provided for the rate change valves 28 and 29 for which the mechanism is as follows. The gear 30 as previously noted, meshes with gear 31 and meshing with gear 31 is a segment 64, see Figs. 4, 7, 8, etc., on an arm 65 having its hub fixed on a short shaft 66 journaled in a bracket 67 fixed on saddle 2. Also fixed on shaft 66 is a bevel gear 68 meshing with a bevel gear 69 fixed on a short shaft 70 upon which is also fixed a segment 71, meshing with suitable rack teeth 72$^a$ of a vertical rod 72. Rod 72 at its upper end engages by the means of suitable rack teeth 72$^b$, see Figs. 3, 8, and 12, with gear teeth 73$^a$ on a shaft 73 journaled in saddle 2, and projecting from the front edge of the saddle where a hand lever 74 is fixed upon the projecting end. Thus movement of hand lever 74 in the one or the other direction shifts the rate control valves to the one or the other position previously described to change the table rate. Engaging by the means of rack teeth 75 and 76, see Figs. 12 and 14, with a suitable gear portion 77 fixed on or integral with shaft 73 are a plurality of control plungers or pins 78 and 79, having beveled ends as shown and arranged for the movement of lever 74 to lift the one or the other of the pins into the path of movement of dogs 80 or 81, which are adjustably fixed on the front edge of the table by the means of a T slot 82 and T bolts in the usual manner. The pins 78 and 79 for reasons to be explained later, stand at different distances from the edge of the table and the dogs respectively have beveled pin contacting portions 80$^a$ and 81$^a$ suitably spaced to correspond with the respective pins. The shaft 73 is provided with a cam portion 73$^b$ fixed thereon, see Figs. 3 and 12, and adapted to co-act with a pointed plunger 83 which is pressed forward by a spring 84. The arrangement is such that when the rate change valves are in the one or the other position the point of the plunger rests in one or the other of the notches or low cam portions 73$^c$ or 73$^d$ and when shifted to change to the other position the plunger is forced back as the shaft 73 turns, until the point of the cam moves past the point of the plunger, after which the plunger reacts on the cam to quickly shift the rate change valve to its opposite position. As previously noted either direction of movement will move one of trip pins 78 or 79 up into the path of movement of one of the dogs 80 or 81, and the proper dog may be positioned to contact the raised pin during the continued movement of the table and move it down again until the point of the cam has passed the plunger, which then quickly completes the valve movement to change the rate, and at the same time raises the other plunger into the path of the other dog where it may later be contacted to similarly change the rate again. Thus during movement of the table in either direction the rate may be changed at any point and as often as desired by suitably positioning suitable dogs similar to dogs 80 and 81.

It may occur that rate changes are desired during one direction of table travel which are not desired at corresponding table positions in the opposite direction of travel. In such case, dogs similar to 80 and 81 are used but with the pin contacting portions hinged or latched to be effective in only one direction of table travel, but since such hinged or latched dogs are well known in the operation of mechanically actuated supports, such dog construction is not here shown.

Both manual and power movement is provided for the reverse valves 38 and 40 for which the mechanism is as follows. The gear 51, see Figs. 4, 5, 6, 8, which connects the valve stems as previously described meshes with a gear 85 fixed on a shaft 86 which also has a pinion portion 87 fixed upon or integral with it. A vertical rod 88 is provided with suitable rack teeth meshing with the teeth of pinion 87 and extends upward into saddle 2 where it engages by the means of rack teeth 88$^a$, see Figs. 3 and 13, with a pinion portion 89$^a$ of a shaft 89 journaled in the saddle. An end of shaft 89 projects from the saddle and has keyed thereon a removable hand lever 90 held in place by a nut 90$^a$ threaded on the shaft, but which is removable for removing the hand lever. The shaft 89 carries a member 91, which may turn independently to an adjustably limited extent. Member 91 is provided with ears or lugs 92 and 93, see Fig. 14, which carry adjustable screws 94 and 95 respectively adapted to contact with opposite sides of a lug or pin 96 fixed with shaft 89. The screw 94 and 95 may be adjusted to permit a considerable movement of member 91 in either direction before the points of the screws contact with lug 96 to move shaft 89. A plate or cover member 97 may be removed after handle 90 is removed, to expose screws 94 and 95 for adjustment. The member 91 is extended and provided with a toothed portion or pinion 98 upon opposite peripheral sides of which a plurality of trip pins or plungers 99 and 100, see Figs. 1-14, are engaged by the means of suitable rack teeth. The arrangement is such that the pins are moved oppositely when member 91 is moved, and a movement of member 91 to a position effective to position the reverse valves 38 and 40 for table movement to the right in Fig. 1 will move the left hand pin upward and the other pin downward, and vice versa. Fixed on member 91 is a cam portion 101, see Figs. 13 and 14, configurated to provide a central notch 102 and high points 103 and 104 on each side of the notch. A pointed plunger 105 co-acts with cam 101 under pressure of a spring 106. When member 91 is moved in either direction to move the cam points 103 or 104 past the point of plunger 105, the cam and plunger will cooperate under pressure of spring 106 to continue the movement of member 91 until the reverse valves 38 and 40 have been moved to the full extent of their movement in such direction.

The construction described provides an adjustable lost motion device interposed in the motion transmitting connections between the pins 99, 100, and the valves to be controlled thereby, but not between the hand lever 90 and the valves.

Figure 13:
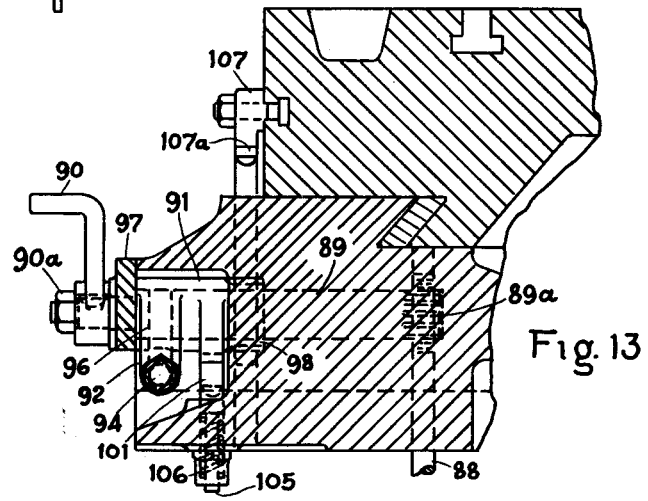
Fig. 13 is an enlarged section of a portion of saddle and table along line 13—13 of Fig. 1.

Dogs 107 and 108, see Figs. 1 and 13, are adjustably fixed on the front of the table by the means of T slot 82 and T bolts in the usual manner, and are each provided with contact portions 107ª and 108ª positioned to contact with the pins 99 or 100 during the travel of table 5 in the one or the other direction. The contact portions may be made of such dimensions as to force the pins contacted downward to any desired extent, sufficient to move member 91 until the notch of cam 101 has been moved past the point of plunger 105 in either direction of travel, by the one or the other dog. However, it will occur that if the screws 94 and 95 are suitably adjusted, the reverse valves will be moved to a by-pass position before this happens, and the table will cease to move while the plunger is still engaged in the notch which will yieldably hold the valves in such position until lever 90 has been manually operated. It is to be noted however that the lever cannot be operated to continue the table movement in the same direction because prevented by contact between the pin and the dog which has just forced it down, but table movement may be re-established in the opposite direction, by continuing the movement started by the dog until the cam notch moves past the plunger point when the cam and plunger will quickly move the valves under pressure from spring 106. Such is the operation if the screws 94 and 95 are adjusted to provide little or no lost motion between the ends of the screws and the lug 96. But if adjusted to provide considerable lost motion, so much as may be necessary to permit the central notch 102 to move completely past the point of the plunger before the reverse valves are moved by a by-pass position, then immediately after the valves reach a by-pass position the cam and plunger will cooperate under the pressure of the plunger spring to continue the movement of the valves until the opposite valve position is reached and the table will immediately start to move in the opposite direction. Thus either a stop or a reversal of table movement may be effected at either end of the table stroke in accordance with the adjustment of screws 94 and 95. The screws may both be adjusted to give a reversal of table movement in which case when once started by hand lever 90 the table will continue an automatic forward and backward movement indefinitely. Also either screw may be adjusted to cause a stop at the one end of the table travel and the other screw to effect a reversal of table movement. Thus the table may for instance, be started by hand movement of lever 90 to travel to the left in Fig. 1, and after completing the desired left movement dog 108 will strike pin 99, and screw 94 being properly adjusted the table movement will be reversed. The table then travels to the right until the starting point is reached, when dog 107 contacts pin 100 and screw 94 being properly adjusted the table stops. This constitutes an automatic cycle of forward and return movement which may be performed in either direction.

The handle 90 is connected directly to the valves without motion being transmitted through the lost motion connection as previously noted, and thus, even though the lost motion device is adjusted to provide table reversal when the reverse valves are dog actuated table movement may always be interrupted at any point by positioning the hand lever centrally, to bring the notch 102 into position for engagement by the plunger 105.

It will be noted that the rate change trip pins 78 and 79 are spaced at different distances from the front face of table 5. This is in order that the dogs effective on the respective pins will not contact the other pin on the continued or return movement of the table. In the case of the reverse pins 99—100 such different spacing is unnecessary because the dogs for these pins never travel past the pin contacted. Thus there are three lines of dog travel, one effective for reversing or stopping the table, one effective for changing the table rate from fast to slow, and one effective for changing the table rate from slow to fast, and although in the drawings the dogs have been shown individual to the different lines of travel it is obvious that a single dog may be provided with contact portions effective on more than one line of travel. This is sometimes desirable for instance in the case that the desired table movement requires one of the rate change dogs and a reverse dog to occupy the same or nearly the same portion of the slot 82, although in such case the contact portions of different dogs may be offset to accomplish the same result.

To prevent damage in the case that the table meets with undue resistance to movement, an adjustable by-pass relief valve 110 is provided, see Figs. 4, 5, 6, and 8. This valve may be any of several well known types in which an adjusting member 110ª projects outside the valve housing, the valve is connected by a channel 111 with the pressure channels 44, and by a channel 112 with the suction channels 41, and is adjusted to permit fluid to be short circuited from the pressure to the suction channels without passing to cylinder 9 in the case when the fluid pressure exceeds a predetermined maximum less than that sufficient to cause damage. For all lesser pressures the valve is ineffective to by-pass any fluid. Adjustable by-pass valves being well known in various forms, the construction details of valve 110 are not shown.

It will be noted that the fluid channels together with the pump, valves and cylinder provide a closed fluid system, in which the pump displaces fluid from one portion of the system to another and in which the total volume of fluid contained in the system does not vary. At all points where movable members project in a manner which might give rise to fluid leakage from the system suitable packing is used, and at suitable points in the closed system suitable openings not shown, normally closed by plugs or valves are provided for introducing fluid into the system and for withdrawing air therefrom. A removable housing or box 113, provides a reservoir fixed on saddle 2 in a manner to form a substantially closed chamber 114 containing the pumps and valves, and a large part of the piping forming the fluid channels. This chamber is filled with fluid substantially up to the level where the box 113 is fastened to the saddle, and it is to be noted that with the exception of the points where the piston rod 12 projects from the cylinder ends, all of the moving parts projecting from the closed fluid system in a manner which might permit air to enter the closed system, or fluid to leak from it are thus maintained submerged in a body of fluid. At both ends of the cylinder where rod 12 projects, packing is provided as at 116, Figs. 1 and 8. Such packing is readily accessible to be maintained in effective condition without disassembly of any portions of the device and as noted, all other points of possible leakage in or out of the system are continuously submerged in a body of fluid whereby out leakage is opposed by the hydrostatic pressure of the fluid body and in leakage can only consist of fluid, instead of air which would be detrimental to operation. There are no openings in the reservoir 113 below the level of the fluid with the exception of a drain opening 117, closed by a pipe plug 118, all of the operating instrumentalities being introduced from above the fluid level, whereby no leakage of fluid may take place from the reservoir.

Thus by the construction disclosed the possibility of leakage in or out of the closed system is substantially reduced and such leakage as may take place is rendered substantially harmless in the operation of the device, and with minor and easily adjusted exceptions it is unnecessary to maintain packing devices for moving members in a high state of perfection, although by removing box 113 all such moving members are readily accessible.

It is to be noted that all the members within box or housing 113 are supported from saddle 2 independently of the housing. This is of great advantage in several ways, particularly in that when the housing is removed for any adjustments, it is unnecessary to disassemble any of the operating parts of the mechanism and adjustments may be made with all parts operative for the operation of the machine.

In the milling machine shown in Fig. 1b the support 1 is in the form of a knee guided for vertical movement on a column or support 119, whereby the table 5 and a work piece 120 mounted thereon is provided with three mutually transverse movements relative to a rotary milling cutter 121 fixed on an arbor 122 fixed with a tool spindle or support 123. The member 23 previously described is here shown together with the other portions of the extensible universal joint shaft previously mentioned and here generally denoted by the numeral 124. Joint shaft 124 may derive power from any suitable source as previously noted and in this case is preferably driven by suitable transmission mechanism from the drive pulley 125 which also drives the cutter 121.

It is to be understood that, for convenience of drawings and description, many of the mechanisms are shown in a simplified form, although completely illustrative of my invention. It is contemplated for instance, that well known methods of anti-friction mounting and support may be used for various of the control members, and particularly that the movable valve members should be constructed with anti-friction mountings to avoid undue resistance to movement when under pressure, but such details of construction although contemplated form no part of this invention It will be apparent that in the light of this disclosure, a variety of modified but equivalent forms of the invention here shown may be constructed by those familiar with the art, each of which it is desired to reserve to the inventor if within the spirit and scope of the following claims.

I claim:

1. A machine tool comprising a rotatable tool spindle, a support movable relative to said spindle in a direction transverse to the spindle axis, a reversibly fluid operable motor for said relative movement and having a plurality of ports, a relatively small delivery uni-directional output feed rate pump, a relatively large delivery uni-directional output quick traverse rate pump, each of said pumps having an inlet and an outlet port, channels connectible for connecting either port of said feed pump with either port of said motor and simultaneously connecting the other pump port with the other motor port, whereby to effect a closed feed circuit in either feed direction, said channels being also connectible for connecting the outlet port of said quick traverse pump with either port of said motor, and valve means associated with said channels and operable to effect each of said connections thereof.

2. In a machine tool the combination of a base, a tool spindle rotatably supported from said base, a work table supported from said base for movement in a direction transverse to the axis of said spindle, a fluid operable motor for movement of said table and having a plurality of ports, a uni-directional output pump having an inlet and an outlet port, fluid channels connectible for said pump outlet port to deliver fluid to one of said motor ports and simultaneously connectible for the other motor port to deliver fluid through a substantially closed passage to said pump inlet port, said channels also having another connection, and valve means associated with said channels and alternatively operable to effect said simultaneous connections of said channels or to effect said other connection thereof.

3. In a machine tool the combination of a base, a tool spindle rotatably supported from said base, a work support supported from said base for movement in a direction transverse to the axis of said spindle, a reversibly fluid operable motor for movement of said support and having a plurality of ports, whereby said motor provides an outlet port in either direction of motor operation, a uni-directional output pump having an inlet port and an outlet port, first and second fluid channels respectively communicating with different ports of said motor, third and fourth fluid channels respectively communicating with the different ports of said pump, and valve means associated with said channels and operable to effect a connection of said first with said third channel and a simultaneous connection of said second with said fourth channel, said valve means being alternatively operable to effect a connection of said first with said fourth channel and a connection of said second with said third channel, said channels and valve means being operative in either of said alternative valve operations to effect a closed passageway from said outlet port of said motor to said pump inlet port.

4. In a machine tool the combination of a base, a tool spindle rotatably supported from said base, a work support supported from said base for movement in a direction transverse to the axis of said spindle, a fluid operable motor for movement of said support and having a plurality of ports, one of which is an outlet port, a uni-directional output pump having an inlet port and an outlet port, first and second fluid channels respectively communicating with the different ports of said motor, third and fourth fluid channels respectively communicating with the different ports of said pump, and valve means associated with said channels and operable to effect a closed connection of said first with said third channel and a simultaneous closed connection of said second with said fourth channel, said valve means being alternatively operable to connect said third and fourth channels whereby to by-pass said pump, and said channels and valve means being operative during said simultaneous channel connection to provide a closed passageway from said outlet port of said motor to said inlet port of said pump.

5. In a machine tool the combination of a base, a tool spindle rotatably supported from said base, a work support supported from said base for movement in a direction transverse to the axis of said spindle, a reversibly fluid operable motor for movement of said support and having a plurality of ports, whereby said motor provides an outlet port in either direction of motor operation, a uni-directional output pump having an inlet port and an outlet port, first and second fluid channels respectively communicating with different ports of said motor, third and fourth fluid channels respectively communicating with the different ports of said pump, and valve means associated with said channels and operable to effect a closed connection between said first and third channels and a simultaneous closed connection between said second and fourth channels and alternatively operable to effect a closed connection between said second and third channels, said valve means being also operable to connect said third and fourth channels whereby to by-pass said pump, and said channels and valve means being operative in either of said alternative valve operations to effect a closed passageway from said outlet port of said motor to said pump inlet port.

6. In a machine tool the combination of a rotatable tool spindle, a support movable relative thereto in a path transverse to the axis thereof, a transmission for moving said support including a reversibly fluid operable motor having a plurality of ports, whereby in either direction of motor actuation said motor provides an outlet port, pump means including a feed rate pump for relatively small volume of fluid delivery and having an inlet port and a rapid traverse rate pump for relatively large volume of fluid delivery, each of said pumps being of uni-directional output, and channels having connections between said pump means and said motor including a plurality of connections changeable to alternately connect said pumps for feed or quick traverse rates and to shift the connections to affect the direction of motor actuation, one of said channel connections being such as to effect a closed passageway from said outlet port of said motor to said inlet port of said feed pump; and control means for said transmission including valve means associated with said channels and selectively operable for effecting each of said changes in the channel connections.

7. In a milling machine the combination of a rotatable tool spindle, a work support guided for reciprocatory movement in a path transverse to the axis of said spindle, a transmission for movement of said support including a reversibly fluid operable motor having a plurality of ports, whereby in either direction of operation said motor provides an outlet port, pump means including a feed rate pump for relatively small volume of fluid delivery and having an inlet port and a rapid traverse rate pump for relatively large volume of fluid delivery, each of said pumps being of uni-directional output, and channels having connections between said pump means and motor including a plurality of connections changeable to alternately connect said pumps for feed or quick traverse rates and to shift the connections to affect the direction of motor actuation, one of said connections being such as to effect a closed passageway between the outlet port of said motor and the inlet port of said feed pump, and another connection operable to disconnect said pump means from said motor; and control means for said transmission including valve means associated with said channels and selectively operable for effecting each of said changes in the channel connections.

8. In a milling machine the combination of a rotatable tool spindle, a work support movable in a direction transverse to the axis of said spindle, a transmission for movement of said support including a reversibly fluid operable motor, pump means including a feed rate pump for relatively small volume of fluid delivery and adjustable for changing said volume and a rapid traverse rate pump for relatively large volume of fluid delivery, each of said pumps being of uni-directional output, and channels having connections between said pump means and motor including a plurality of connections changeable to alternatively connect said pumps for feed or quick traverse rates and to shift the connections to affect the direction of motor actuation, one of said connections being such as to effect a closed passageway for said feed rate pump to receive fluid from said motor; and control means for said transmission including means for adjusting said feed pump, and valve means associated with said channels and operable independently of said feed adjusting means for selectively effecting each of said changes in the channel connections.

9. In a milling machine the combination of a rotatable tool spindle, a support reciprocable in a path transverse to the axis of said spindle, transmission mechanism for movement of said support including a cylinder, a piston movable therein, fluid channels, and power driven fluid pump means, said channels and pump means being collectively adapted to supply said cylinder with fluid for movement of said support alternatively in either direction, and alternatively at feed or quick traverse rate in one of said directions, means positively limiting the movement of said support in said direction, control means for said transmission adjustable to vary said feed rate while maintaining said direction of support movement, other control means operable independently of said adjustable means to change the flow of transmission fluid from one end of said cylinder to the other whereby to reverse the movement of said support, and a dog adjustably adapted during support movement in said direction to operate said other control means before the operation of said means positively limiting the movement of said support, said other control means being alternatively operable to stop instead of to reverse said support.

10. A machine tool comprising a movable support, means for movement thereof including a hydraulic cylinder and fluid supply channels therefor, a rotatable element journaled in said support and having a projecting end adapted to provide a power coupling for the driving of attachments, and transmission mechanism connecting said element to be rotated from the movement of said support.

11. A machine tool comprising a movable support, means for movement of said support including a hydraulic piston and cylinder and fluid supply channels therefor, a rotatable element, and transmission mechanism for the rotation of said element from the relative movement of said piston and cylinder, said transmission mechanism including said support as an element thereof.

12. A machine tool comprising a saddle, a table reciprocably supported therefrom, means for power movement of said table including a hydraulic cylinder and fluid supply channels therefor, a screw rotatably journaled in said table and having a projecting end adapted to provide a power coupling, and a nut fixed in said saddle and in threaded engagement with said screw, whereby said screw is rotated from the movement of said table.

13. In a milling machine the combination of a rotatable tool spindle, a work support movable relative thereto in a direction transverse to the spindle axis, a transmission for movement of said support including a fluid operable motor, pump means including a feed rate pump for relatively small volume of fluid delivery and adjustable for changing said volume and a quick traverse rate pump for relatively large volume of fluid delivery, each of said pumps being of uni-directional output, and fluid channels for connecting said pump means to operate said motor at either of said rates, said channel connnection for said feed rate being such as to effect a closed passageway for said feed rate pump to receive fluid from said motor; and control means for said transmission including means for adjusting said feed pump, valve means associated with said channels and operable independently of said pump adjusting means to effect a channel connection to abruptly change from the one to the other of said rates, and a power actuated dog adapted at an intermediate point in the movement of said support to effect said operation of said valve means.

14. A machine tool comprising a movable support, hydraulic transmission mechanism for propelling said support in the one or the other of opposite directions, valve means associated with said transmission mechanism and movable in opposite directions to different positions respectively effective to cause said transmission to move said support in the one or the other direction, said valve means being movable from either of said positions to an intermediate point where said transmission is ineffective for support movement, means including a dog operable trip device for moving said valve means from one of said positions, and means selectively adaptable to thereafter continue the movement of said valve means past said intermediate point to the other of said positions whereby to cause a reversal of support movement, or to stop the movement of said valve means at said intermediate point whereby to stop said support.

15. A machine tool comprising a movable support, hydraulic transmission mechanism for propelling said support in the one or the other of opposite directions, valve means associated with said transmission mechanism and movable in opposite directions to different positions respectively effective to cause said transmission to move said support in the one or the other direction, said valve means being movable from either of said positions to an intermediate point in which said transmission is ineffective for support movement, means including a dog operable trip device for moving said valve means from one of said positions, and means including a lost motion device for thereafter continuing the movement of said valve means past said intermediate point to the other of said positions to cause a reversal of support movement, said lost motion device having a portion adjustable to a position rendering said device inoperative for continuing the movement of said valve means, whereby movement of said support may be stopped instead of reversed.

16. A machine tool comprising a movable support, hydraulic transmission mechanism for propelling said support in the one or the other of opposite directions, valve means associated with said transmission mechanism and movable in opposite directions to different positions respectively effective to cause said transmission to move said support in the one or the other direction, said valve means being movable from either of said positions to an intermediate point where said transmission is ineffective for support movement, means including a trip device dog operable in different directions respectively for movement of said valve means from the one or the other of said positions, and means associated with said trip device and selectively operable in either direction of support movement to thereafter continue the movement of said valve means past said intermediate point to cause a reversal of support movement, or to stop the movement of said valve means at said intermediate point, whereby movement of the support may be selectively reversed or stopped after movement in either direction.

17. In a machine tool having a movable support, the combination of hydraulic transmission mechanism including a source of fluid supply and mechanism movable from fluid supplied therefrom for movement of said support, a first valve means shiftable for abruptly changing the rate at which fluid is supplied to said mechanism, a second valve means shiftable for changing the direction in which fluid is supplied to said mechanism, a plurality of trip mechanism respectively connected for movement of the respective valve means, and a plurality of dogs respectively adapted during movement of said support to contact and move the respective trip mechanisms.

18. In a machine tool having a support and a saddle and a table each slidably supported thereon, the combination of a cylinder and a piston, one of which is fixed with said saddle and the other with said table for relative movement therebetween, a power actuated fluid pump fixed on said saddle and bodily movable therewith, and a fluid channel connecting said cylinder to receive fluid from said pump.

19. A transmission and control mechanism for machine tools having a movable support, comprising a fluid operable device for movement of said support, a first means for delivering to said device fluid at a relatively low rate and operable for varying said rate, a second means operable for abruptly materially increasing the rate at which fluid is delivered to said device, a third means operable for changing the direction of fluid operation of said device, a manually operable control device for said first means, and a plurality of dog operable control devices respectively for said second and third means, each of said control devices being separately operable.

20. In a milling machine, the combination of a movable table, a movable saddle and a movable knee, together constituting supports movable for table movement in three transverse paths, a fluid operable piston and cylinder, said cylinder being fixed with said saddle and said piston being fitted therein and fixed for movement with said table, a mechanical transmission including a member rotatably journaled in one of said movable supports and a drive train therefor adapted to permit movement thereof relative to an exterior power source, a fluid transmission train connecting said member for movement of said piston, and operable for altering the effect of said member on said piston, a dog adjustably mounted on said table, a trip element mounted on said saddle and movable into the path of movement of said dog, and motion transmitting connections from said trip element for said operation of said fluid transmission.

21. In a milling machine, the combination of a rotatable tool spindle, a work support adjacent thereto and movable in a path transverse to the axis of said spindle, a transmission for movement of said support including a fluid operable motor connected for said movement of said support, a uni-directional output power driven pump adustable to change the rate of motor actuation, and channels alternatively connectible between said pump and motor for effecting the one or the other direction of motor movement; and control means for said transmission including means for said adjustment of said pump, valve means for said alternative connection of said channels and operable independently of said pump adjusting means, a trip element connected for movement of said valve means, and a power operated dog movable to contact and shift said trip element during movement of said support.

22. In a milling machine, the combination of a rotatable tool spindle, a work support adjacent thereto and movable in a path transverse to the axis thereof, a fluid operable motor connected with said support, a power driven fluid pump, channels connecting said pump and motor, valve means associated with said channels for changing the direction of motor movement relative to said pump, a trip element, a motion transmitting train connecting said trip element and valve means and including a lost motion device, and a dog adapted during support movement to contact and shift said trip element, said lost motion device being adjustable to determine the amount of resulting movement of said valve means.

23. In a milling machine, the combination of a rotatable tool spindle, a work support adjacent thereto and reciprocable in a path transverse to the axis thereof, a reversibly fluid operable motor connected with said support, power driven fluid pump means, channels for connecting said pump means and motor for either direction of motor operation, shiftable valve means associated with said channels and having a position operative to interrupt the flow of fluid from said pump means to said motor, a trip device operable for movement of said valve means to said position, and a plurality of dogs spaced apart to operate said trip means respectively during the one or the other direction of support movement, whereby to interrupt the movement thereof in either direction.

24. In a milling machine, the combination of a rotatable tool spindle, a support movable relative thereto in a path transverse to the axis of said spindle and in forward and reverse directions in said path, means for movement of said support in either direction including a hydraulic circuit comprising a pump and a motor, means automatically controlling movement of fluid within said hydraulic circuit to reverse the direction of support movement after movement in a forward direction, and automatic means for interrupting fluid movement from said pump to said motor when said support has been returned to a given position after a forward and reverse movement.

25. In a milling machine, the combination of a rotatable tool spindle, a support movable relative thereto in a path transverse to the axis of said spindle and in forward and reverse directions in said path, means for movement of said support in either direction including a hydraulic circuit comprising a pump and a motor, and means controlling movement of fluid within said hydraulic circuit including automatic means for interrupting fluid movement from said pump to said motor after said support has been moved in either direction and in the other direction.

26. In a milling machine the combination of a rotatable spindle, a work support adjacent thereto and movable in a path transverse to the axis thereof, a transmission for said support including a fluid operable motor connected therewith and a plurality of power actuated uni-directional output pumps operable for the actuation of said motor alternatively at feed or quick traverse rates; and control means for said transmission including a plurality of devices separably operable respectively for delivery of fluid from said pumps to said motor selectively for the one or the other of said rates, and for reversing the direction of motor actuation relative to the direction of actuation of said pumps.

27. In a milling machine, the combination of a rotatable spindle, a work support adjacent thereto and movable in a path transverse to the axis thereof, a transmission for said support including a fluid operable motor connected therewith and a plurality of power actuated uni-directional output pumps operable for the actuation of said motor alternatively at feed or quick traverse rates; and control means for said transmission including means operable for delivery of fluid from said pumps to said motor selectively for the one or the other of said rates and an independently operable reverser valve positioned in said transmission to be operable to reverse the direction of motor actuation relative to the direction of fluid delivery from each of said pumps.

28. In a milling machine, the combination of a rotatable tool spindle, a work support adjacent thereto and movable in a path transverse to the axis thereof, a transmission for movement of said support including a fluid operable motor mechanically connected with said support, a uni-directional output feed rate pump having a relatively small volume of fluid delivery and adjustable to change said volume, a uni-directional output quick traverse rate pump having a substantially constant relatively large volume of fluid delivery, and fluid channels differently connectible between said pumps and motor for actuation of said motor selectively at the one or the other of said rates; and control means associated with said transmission and including a first controller for said adjustment of said feed pump, and a second controller separately operable for alternatively effecting said different connections of said channels to move said motor at the feed rate determined by said first controller or at a quick traverse rate.

29. In a milling machine, the combination of a rotatable tool spindle, a work support adjacent thereto and movable in a path transverse to the axis thereof, a transmission for movement of said support including a reversibly fluid operable motor mechanically connected with said support, pump means including a feed rate pump having relatively small volume of fluid delivery and adjustable to change said volume and a quick traverse rate pump having a relatively large volume of fluid delivery, each of said pumps being of uni-directional output, and fluid channels differently connectible between said pump means and motor for movement of said motor selectively at the one or the other of said rates and selectively in the one or the other direction; and control means associated with said transmission and including a first controller for said adjustment of said feed pump, a second controller for alternatively effecting certain of said different connections of said channels to move said motor at the feed rate determined by said first controller or at a quick traverse rate, and a third controller for alternatively effecting other of said connections of said channels to move said motor in the one or the other direction.

30. In a milling machine, the combination of a rotatable tool spindle, a work support adjacent thereto and movable in a path transverse to the axis thereof, a transmission for movement of said support including a reversibly fluid operable motor mechanically connected with said support, pump means including a uni-directional flow feed rate pump having relatively small volume of fluid delivery and a uni-directional flow quick traverse rate pump having a relatively large volume of fluid delivery, and channels having connections between said pump means and motor including a connection for changing the direction of motor actuation and a connection for changing the rate thereof; and control means for said transmission including valve means associated with said channels and shiftable for effecting each of said channel connections, and power means for the operation of said valve means including a plurality of relatively adjustable dogs spaced apart and respectively for operation of said valve means to effect different of said channel connections during a uni-directional movement of said support.

31. In a milling machine, the combination of a rotatable tool spindle, a work support reciprocable in a path transverse to the axis of said spindle, a fluid operable motor connected for movement of said support, a plurality of power operable pumps connectible for the actuation of said motor alternatively at feed or quick traverse rates, a controller shiftable for connecting said pumps to effect the one or the other of said rates during a given direction of support movement, a movable trip device connected for movement of said controller, and a power operated dog adapted during uni-directional movement of said support to contact and move said trip device to effect a change from one to the other of said rates.

32. In a milling machine, the combination of a rotatable tool spindle, a work support movable in a path transverse to the axis of said spindle, a fluid operable motor connected for movement of said support, a plurality of power operable pumps connectible for the actuation of said motor alternatively at feed or quick traverse rates, control means shiftable for effecting the one or the other of said rates, reverser means operable separately from said control means and shiftable to reverse the direction of motor actuation, a first trip element shiftable for shifting said control means, a second trip element shiftable for shifting said reverser means, and a plurality of power operated dogs adapted during support movement respectively to contact and shift respective of said trip elements.

33. In a milling machine, the combination of a rotatable tool spindle, a work support movable relative thereto in a path transverse to the axis of said spindle, a fluid operable motor connected for movement of said support and having a plurality of ports, a uni-directional delivery pump adjustable for changing the volume of fluid delivery thereof and having an inlet and an inlet port, a first plurality of channels respectively connecting with different ports of said motor, a second plurality of channels respectively connecting with the different ports of said pump, a controller operable for adjusting said pump, and other control means including valve means associated with said channels and operable independently of said controller for effecting a closed passageway from one of said first plurality of channels to the channels connected with said pump outlet port, said valve means being operable to effect a simultaneous closed passageway from the other of said first plurality of channels to the channel connected with said pump inlet port, said valve means being alternately operable to connect said second plurality of channels with one another to by-pass said pump.

34. In a machine tool having a base and having a plurality of supports supported therefrom for individual bodily movement relative thereto, the combination of a drive shaft rotatably supported for bodily movement with one of said supports, power operated means adapted for driving said drive shaft in various positions of the last mentioned support, and a hydraulic transmission connecting said drive shaft for movement of the other of said supports and supported for bodily movement with said last mentioned support, said transmission being selectively operable for different rates of movement of said other support while said drive shaft is driven at a constant rate.

35. In a machine tool the combination of a rotatable tool spindle, a work support movable for work movement in a direction transverse to the axis of said spindle, a transmission for movement of said support including a fluid operable motor having a plurality of ports, a uni-directional output feed rate pump having relatively small volume of fluid delivery, a uni-directional output quick traverse rate pump having relatively large volume of fluid delivery, each of said pumps having an inlet and an outlet port, a first plurality of channels respectively communicating with the different ports of said motor, a second plurality of channels respectively communicating with the different ports of said feed pump, and a channel communicating with the outlet port of said quick traverse pump; and control means for said transmission including valve means alternatively operable for effecting a closed connection of the last mentioned channel with one of said first plurality of channels whereby said motor is connected for operation at a quick traverse rate or for effecting a feed rate connection including a closed connection from one of said first plurality of channels to one of said second plurality of channels and a simultaneous closed connection from the other of said first plurality of channels to the other of said second plurality of channels, and power operated dog means adapted during movement of said support to operate said valve means for each of said connections.

36. In a machine tool the combination of a rotatable tool spindle, a work support movable for work movement in a direction transverse to the axis of said spindle, a transmission for movement of said support including a fluid operable motor having a plurality of ports, a uni-directional output feed rate pump having relatively small volume of fluid delivery, a uni-directional output quick traverse rate pump having relatively large volume of fluid delivery, each of said pumps having an inlet and an outlet port, a first plurality of channels respectively communicating with the different ports of said motor, a second plurality of channels respectively communicating with the different ports of said feed pump, and a channel communicating with the outlet port of said quick traverse pump; and control means for said transmission including valve means alternatively operable for effecting a closed quick traverse connection of the last mentioned channel with one of said first plurality of channels or for effecting a feed rate connection including a closed connection from one of said first plurality of channels to one of said second plurality of channels and a simultaneous closed connection from the other of said first plurality of channels to the other of said second plurality of channels, and a power operated trip adapted to operate said valve means for changing from said quick traverse connection to said feed rate connection at a predetermined intermediate point in the movement of said support.

37. In a machine tool the combination of a rotatable tool spindle, a support for said spindle, a work support, said supports being relatively movable in a direction transverse to the axis of said spindle, a transmission for said relative movement including a reversibly fluid operable motor having a plurality of ports, pump means including a relatively small delivery uni-directional output feed rate pump and a relatively large delivery uni-directional output quick traverse rate pump, each of said pumps having an inlet and an outlet port, and fluid channels having a variety of connections between said pump means and motor for differently actuating said motor including a plurality of connections respectively for different directions of motor operation and a connection for establishing a feed rate of said motor during motor movement in one of said directions, the last mentioned connection of said channels being such as to provide a substantially closed passageway for the inlet port of said feed pump to receive fluid from one of said motor ports; and control mechanism for said transmission including valve means associated with said channels and operable to selectively effect each of said connections thereof, and a plurality of dogs respectively adapted during movement of said support to operate said valve means to effect different of said connections.

38. In a milling machine, the combination of a rotatable spindle, a work support movable relative to said spindle for work movement in a path transverse to the spindle axis, a transmission for said relative movement including a reversibly fluid operable motor having a plurality of ports, pump means including a relatively small delivery feed rate pump and a relatively large delivery quick traverse rate pump, each of said pumps being of uni-directional delivery and having an inlet and an outlet port, and channels having a variety of connections between said pump means and motor for differently actuating said motor including a plurality of connections respectively for feed and quick traverse rates of motor movement in one direction of motor actuation and a plurality of connections respectively for feed and quick traverse rates of motor movement in the other direction of motor actuation, said connections providing during motor actuation at said feed rate in either direction a closed passageway for the inlet port of said feed pump to receive fluid from one of said motor ports; and control means for said transmission including valve means associated with said channels and adapted to selectively effect each of said connections thereof, and a plurality of dogs respectively adapted during movement of said support to operate said valve means to effect different of said connections.

39. In a milling machine, the combination of a rotatable tool spindle, a work support movable relative to said spindle in a direction transverse to the spindle axis, a transmission for said relative movement including a fluid operable motor having a plurality of ports, a relatively small delivery uni-directional output feed rate pump, a relatively large delivery uni-directional output quick traverse pump, each of said pumps having an inlet and an outlet port, first and second fluid channels respectively communicating with the different ports of said motor, third and fourth fluid channels respectively communicating with the different ports of said feed rate pump, and a fifth channel communicating with the outlet port of said quick traverse rate pump; and control means for said transmission including valve means associated with said channels and alternatively operable to effect a closed connection between said first and third channels and a simultaneous closed connection between said second and fourth channels or to connect said fifth channel with one of said first or second channels, whereby to alternatively effect a feed circuit or a quick traverse circuit to actuate said motor, said valve means also being alternatively operable to effect a connection of said channels to stop said motor.

40. In a milling machine, the combination of a rotatable tool spindle, a work support movable relative to said spindle in a direction transverse to the spindle axis, a transmission for said relative movement including a reversibly fluid operable motor having a plurality of ports, a feed rate pump having relatively small volume of fluid delivery and adjustable to vary said volume, a quick traverse rate pump having relatively large volume of fluid delivery, each of said pumps being of uni-directional output and each having an inlet and an outlet port, first and second fluid channels respectively connecting with the different ports of said motor, third and fourth fluid channels respectively communicating with the different ports of said feed pump, a fifth channel communicating with the outlet port of said quick traverse pump; and control means for said transmission including valve means associated with said channels and alternatively operable to effect a closed connection between said fifth channel and either of said first or second channels, whereby to effect a quick traverse rate of said motor in either direction or to effect a closed connection between said first and third channels and a simultaneous closed connection between said second and fourth channels, whereby to effect a feed circuit to actuate said motor in one of said directions, and other control means including a controller operable independently of said valve means for the adjustment of said feed pump.

41. In a milling machine, the combination of a rotatable tool spindle, a work support movable relative thereto in a direction transverse to the spindle axis, a transmission for said relative movement including a reversibly fluid operable motor having a plurality of ports, a feed rate pump for relatively small volume of fluid delivery and adjustable for changing said volume, a quick traverse rate pump for relatively large volume of fluid delivery, each of said pumps being of uni-directional output and each having an inlet and an outlet port, first and second fluid channels respectively communicating with the different ports of said motor, third and fourth fluid channels respectively communicating with the different ports of said feed pump, a fifth channel communicating with the outlet port of said quick traverse pump; and control means for said transmission including valve means alternatively operable to effect a closed connection from said fifth channel to either of said first or second channels or to effect a closed connection from said first to said third channel and a simultaneous closed connection from said second to said fourth channel, power means for the operation of said valve means at predetermined points in the movement of said support including a plurality of relatively adjustable dogs respectively operative for effecting different of said alternative operations of said valve means, and other control means including a controller operable independently of said valve means for the adjustment of said feed pump.

42. In a milling machine, the combination of a rotatable tool spindle, a work support reciprocable relative thereto in a path transverse to the axis of said spindle, means for limiting the movement of said support in one direction in said path, a transmission for said relative movement including a reversibly fluid operable motor having a plurality of ports, a feed rate pump for a relatively small volume of fluid delivery, a quick traverse rate pump for a relatively large volume of fluid delivery, each of said pumps being of uni-directional output and each having an inlet and an outlet port, first and second fluid channels respectively communicating with the different ports of said motor, third and fourth fluid channels respectively communicating with the different ports of said feed rate pump, a fifth channel communicating with the outlet port of said quick traverse rate pump; and control means for said transmission including valve means alternatively operable to connect said first or said second channel to receive pump fluid whereby to actuate said motor in different directions, and operable to effect a closed connection from said first to said third channel and a simultaneous closed connection from said second to said fourth channel to effect a feed rate of said motor in one of said directions, and power means for the operation of said valve means during movement of said support including a plurality of relatively adjustable dogs, one of said dogs being adapted to operate said valve means to effect said feed rate at a predetermined intermediate point in the movement of said support and the other of said dogs being adapted to thereafter operate said valve means to change from the one to the other of said alternative channel connections whereby to effect a reversal of said motor at predetermined point in the movement of said support prior to the operation of said means for limiting the movement thereof.

43. In a machine tool, the combination of a rotatable tool spindle, a support for said spindle, a work support, said supports being relatively movable in a direction transverse to the axis of said spindle, a transmission for said relative movement including a reversibly fluid operable motor having a plurality of ports, a uni-directional output feed rate pump for relatively small volume of fluid delivery and adjustable for changing said volume, a uni-directional output quick traverse rate pump for relatively large volume of fluid delivery, each of said pumps having an outlet and an inlet port, and channels connectible between said ports for the actuation of said motor in either direction and from said feed rate pump exclusive of said quick traverse rate pump in one of said directions, the last connection being such that the inlet port of said feed rate pump is connected to receive from one of said motor ports through a substantially closed passage; and control means for said transmission including means adjustable for said adjustment of said feed pump, valve means operable independently of said feed pump adjusting means and operable to effect each of said channel connections, and a plurality of dogs respectively adapted during movement of said support to operate said valve means to effect different of said channel connections.

44. In a milling machine, the combination of a rotatable tool spindle, a work support reciprocable in a path transverse to the axis of said spindle, a transmission for movement of said support including a reversibly fluid operable motor having a plurality of ports, a feed rate pump for a relatively small volume of fluid delivery, a quick traverse rate pump for a relatively large volume of fluid delivery, each of said pumps being of uni-directional output and each having an inlet and outlet port, first and second fluid channels respectively communicating with the different ports of said motor, third and fourth fluid channels respectively communicating with the different ports of said feed rate pump, a fifth channel communicating with the outlet port of said quick traverse rate pump; and control means for said transmission including valve means operable to effect a closed connection from said first to said third channel and a simultaneous closed connection from said second to said fourth channel whereby to effect a feed rate fluid circuit, and operable for alternatively connecting the one or the other of said first and second channels to receive pump fluid whereby to effect a reversal of motor actuation, and power operable means for the operation of said valve means during movement of said support including a plurality of relatively adjustable dogs, one of said dogs being adapted to operate said valve means to effect said feed circuit at a predetermined intermediate point in the movement of said support and the other of said dogs being adapted to operate said valve means to effect said motor reversal, said power operable means being alternatively operable for effecting a connection of said channels to stop said motor instead of effecting said reversal thereof.

45. In a milling machine, the combination of a rotatable tool spindle, a work support reciprocable in a path transverse to the axis of said spindle, a transmission for movement of said support including a reversibly fluid operable motor having a plurality of ports, a feed rate pump for a relatively small volume of fluid and adjustable for changing said volume, a quick traverse rate pump for a relatively large volume of fluid, each of said pumps being of uni-directional output and each having an inlet and an outlet port, and channels connectible between said ports for the actuation of said motor in either direction at either of said rates, said channel connections when operative for said feed rate providing a closed passage from the outlet port of said feed rate pump to one of said motor ports and a simultaneous closed passage from the other of said motor ports to the inlet port of said feed rate pump; and control means for said transmission including valve means associated with said channels and operable for effecting each of said channel connections, means operable independently of said valve means for adjusting said feed rate pump, and power operable means for operation of said valve means including a plurality of relatively adjustable dogs each operable to change said channel connections for effecting a change from the one to the other of said rates, said dogs being respectively operable at predetermined intermediate points in different directions of movement of said support.

46. In a machine tool the combination of a reversibly movable support, a transmission for movement of said support including a reversibly fluid operable motor, pump means including a plurality of power actuated uni-directional output pumps, channels for connecting said pump means for actuating said motor in either direction and having another connection operable for disconnecting said motor from both said pumps, valve means associated with said channels and operable for effecting each of said channel connections, and power operable means for operating said valve means at a predetermined point in the movement of said support to effect a change in the connection of said channels for reversing said motor, said power operated means being alternatively operable to effect said other channel connection whereby to disconnect instead of to reverse said motor at said predetermined point.

47. In a milling machine, the combination of a horizontal reciprocable work table, a supporting structure therefor, a rotatable tool spindle at a level above said table and axially transverse to the path of table movement, said structure providing a spindle supporting portion uprising adjacent a longitudinal edge of said table and at one side of a vertical plane passing through said edge, a reversibly fluid operable motor for movement of said table including a cylinder and piston positioned underneath said table for relative reciprocatory movement in a path parallel with the path of table movement, pump means including a feed rate pump having a relatively small volume uni-directional fluid delivery and adjustable for changing said volume and a quick traverse rate pump having a relatively large volume uni-directional fluid delivery, control means for the adjustment of said feed rate pump including a manually operable lever adjustably supported from said structure and having a hand grip portion positioned at the other side of said vertical plane, fluid channels having a variety of connections from said pump means to said motor including a connection for motor operation at a feed rate predetermined by said manually operable lever and a connection for motor operation at a quick traverse rate, valve means operable independently of the adjustment of said manually operable lever for effecting either of said channel connections, an element shiftable for operating said valve means to change the connection of said channels and having a portion exposed adjacent the other longitudinal edge of said table, and a dog on said table adapted to contact said exposed portion at an intermediate point in the table movement whereby to shift said element.

48. In a milling machine, the combination of a horizontally reciprocable work table, a supporting structure therefor, a rotatable tool spindle at a level above said table and axially transverse to the path of table movement, said structure providing a spindle supporting portion uprising adjacent a longitudinal edge of said table and at one side of a vertical plane passing through said edge, a reversibly fluid operable motor for movement of said table including a cylinder and piston positioned underneath said table for relative reciprocatory movement in a path parallel with the path of table movement, pump means including a feed rate pump having a relatively small volume uni-directional fluid delivery and adjustable for changing said volume and a quick traverse rate pump having a relatively large volume uni-directional fluid delivery, control means for the adjustment of said feed rate pump including a manually operable lever adjustably supported from said structure and having a hand grip positioned at the other side of said vertical plane, fluid channels connectible between said pump means and motor and having a connection operative to change the direction of motor actuation and another connection operative to change the rate thereof, valve means operable independently of the adjustment of said manually operable lever for effecting either of said channel connections, control means having different portions each exposed adjacent the other longitudinal edge of said table and respectively dog operable for operating said valve means to effect different of said channel connections, and a plurality of dogs each adjustably fixed on said table and respectively adapted to contact and operate said different portions of said control means.

In witness whereof I hereto affix my signature.

FRED A. PARSONS.

dinal edge of said table and at one side of a vertical plane passing through said edge, a reversibly fluid operable motor for movement of said table including a cylinder and piston positioned underneath said table for relative reciprocatory movement in a path parallel with the path of table movement, pump means including a feed rate pump having a relatively small volume uni-directional fluid delivery and adjustable for changing said volume and a quick traverse rate pump having a relatively large volume uni-directional fluid delivery, control means for the adjustment of said feed rate pump including a manually operable lever adjustably supported from said structure and having a hand grip positioned at the other side of said vertical plane, fluid channels connectible between said pump means and motor and having a connection operative to change the direction of motor actuation and another connection operative to change the rate thereof, valve means operable independently of the adjustment of said manually operable lever for effecting either of said channel connections, control means having different portions each exposed adjacent the other longitudinal edge of said table and respectively dog operable for operating said valve means to effect different of said channel connections, and a plurality of dogs each adjustably fixed on said table and respectively adapted to contact and operate said different portions of said control means.

In witness whereof I hereto affix my signature.

FRED A. PARSONS.

CERTIFICATE OF CORRECTION.

Patent No. 1,740,744.  Granted December 24, 1929, to

FRED A. PARSONS.

It is hereby certified that error appears in the printed specification of the above numbered patent requiring correction as follows: Page 8, lines 23, 24 and 51, claims 6 and 7, respectively, for "alternately" read alternatively; page 12, line 33, claim 33, for "inlet" second occurrence read outlet, line 43, for "channels" second occurrence read channel, and line 49, for "alternately" read alternatively; page 14, line 103, claim 43, after "last" insert the word "mentioned", and in line 105, after "receive" insert the word "fluid"; line 126, claim 44, after "and" second occurrence, insert the word "an"; page 15, line 84, claim 47, for "horizontal" read horizontally; and that the said Letters Patent should be read with these corrections therein that the same may conform to the record of the case in the Patent Office.

Signed and sealed this 6th day of January. A. D. 1931.

M. J. Moore,
Acting Commissioner of Patents.

DISCLAIMER 1,740,744.—*Fred A. Parsons*, Milwaukee, Wis. FLUID TRANSMISSION AND CONTROL MEANS FOR MACHINE TOOLS. Patent dated December 24, 1929. Disclaimer filed October 8, 1934, by the assignee, *Kearney & Trecker Corporation*.

Hereby enters its disclaimer to said claims 17, 19, and 46 of said Letters Patent, which are in the following words, to wit:

"17. In a machine tool having a movable support, the combination of hydraulic transmission mechanism including a source of fluid supply and mechanism movable from fluid supplied therefrom for movement of said support, a first valve means shiftable for abruptly changing the rate at which fluid is supplied to said mechanism, a second valve means shiftable for changing the direction in which fluid is supplied to said mechanism, a plurality of trip mechanism respectively connected for movement of the respective valve means, and a plurality of dogs respectively adapted during movement of said support to contact and move the respective trip mechanisms."

"19. A transmission and control mechanism for machine tools having a movable support, comprising a fluid operable device for movement of said support, a first means for delivering to said device fluid at a relatively low rate and operable for varying said rate, a second means operable for abruptly materially increasing the rate at which fluid is delivered to said device, a third means operable for changing the direction of fluid operation of said device, a manually operable control device for said first means, and a plurality of dog operable control devices respectively for said second and third means, each of said control devices being separately operable."

"46. In a machine tool the combination of a reversibly movable support, a transmission for movement of said support including a reversibly fluid operable motor, pump means including a plurality of power actuated unidirectional output pumps, channels for connecting said pump means for actuating said motor in either direction and having another connection operable for disconnecting said motor from both said pumps, valve means associated with said channels and operable for effecting each of said channel connections, and power operable means for operating said valve means at a predetermined point in the movement of said support to effect a change in the connection of said channels for reversing said motor, said power operated means being alternatively operable to effect said other channel connection whereby to disconnect instead of to reverse said motor at said predetermined point."

[*Official Gazette October 30, 1934.*]